US005721790A

United States Patent [19]
Klenner

[11] Patent Number: 5,721,790
[45] Date of Patent: Feb. 24, 1998

[54] METHODS AND APPARATUS FOR SEPARATING INTEGER AND FRACTIONAL PORTIONS OF A FINANCIAL AMOUNT

[75] Inventor: Norbert Klenner, Reichenau, Germany

[73] Assignee: Unisys Corporation

[21] Appl. No.: 4,203

[22] Filed: Jan. 11, 1993

Related U.S. Application Data

[63] Continuation of Ser. No. 600,418, Oct. 19, 1990, abandoned.

[51] Int. Cl.⁶ .................................................. G06K 9/00
[52] U.S. Cl. ........................ 382/138; 382/178; 382/179
[58] Field of Search .................... 382/7, 8, 1, 57, 382/9, 18, 46, 137, 138, 173, 177, 178, 179, 174, 270, 274, 275

[56] References Cited

U.S. PATENT DOCUMENTS

| | | | |
|---|---|---|---|
| 4,490,846 | 12/1984 | Ishida et al. | 382/7 |
| 4,523,330 | 6/1985 | Cain | 382/7 |
| 4,558,461 | 12/1985 | Schlang | 382/9 |
| 4,590,606 | 5/1986 | Rohrer | 382/7 |
| 4,628,194 | 12/1986 | Dobbins et al. | 235/379 |
| 4,685,141 | 8/1987 | Hoque et al. | 382/7 |
| 4,722,444 | 2/1988 | Murphy et al. | 382/7 |
| 4,764,972 | 8/1988 | Yoshida et al. | 382/13 |
| 4,823,393 | 4/1989 | Kawakami | 382/7 |
| 4,837,842 | 6/1989 | Holt | 382/7 |
| 4,888,812 | 12/1989 | Dinan et al. | 382/7 |
| 4,914,709 | 4/1990 | Rudak | 382/57 |
| 5,014,325 | 5/1991 | Moritomo | 382/7 |
| 5,025,475 | 6/1991 | Okabe | 382/1 |
| 5,097,517 | 3/1992 | Holt | 382/7 |
| 5,119,433 | 6/1992 | Will | 382/7 |

Primary Examiner—Leo Boudreau
Assistant Examiner—Phuoc Tran
Attorney, Agent, or Firm—Nathan Cass; Mark T. Starr

[57] ABSTRACT

A method for separating integer and fractional portions of a financial amount preparatory to recognition of the financial amount. This separating is accomplished based on determining the presence of at least one of a plurality of possible distinguishing separation characteristics, such as the presence of a period (decimal point), superscripted characters, or a fraction. The separated fractional portion is then categorized into one of a plurality of categories based on the nature of the fractional portion representation. The characters making up this fractional portion are then extracted based on this categorizing.

26 Claims, 9 Drawing Sheets

METHODS AND APPARATUS FOR SEPARATING INTEGER AND FRACTIONAL PORTIONS OF A FINANCIAL AMOUNT

This application is a continuation of patent application Ser. No. 07/600,418, filed Oct. 19, 1990, abandoned.

BACKGROUND OF THE INVENTION

The present invention relates generally to improved means and methods for automatically recognizing data on documents, and more specifically to improved means and methods for automatically recognizing amount information on financial documents, such as checks, invoices and remittance documents.

Today's financial services industry is facing the immense challenge of processing huge amounts of documents efficiently. Predictions that document payment methods would decline have not been realized. In fact, document payment methods have grown worldwide and are expected to continue increasing. There is thus a vital need to devise improved methods for processing such documents.

The use of imaging technology as an aid to document processing has been recognized as one way of significantly improving document processing, as disclosed, for example, in U.S. Pat. Nos. 4,205,780; 4,264,808; 4,672,186; and 4,888,812. Generally, imaging involves optically scanning documents to produce electronic images that are processed electronically and stored on high capacity storage media (such as magnetic disc drives and/or optical memory) for later retrieval and display. It is apparent that document imaging provides the opportunity to reduce document handling and movement, since these electronic images can be used in place of the actual document. For example, document images can be retrieved from storage and displayed on workstations where operators can enter amount data and other information based on the observed images, instead of having to view the documents directly.

Although the use of imaging in a document processing system can provide significant improvements, the need for operator viewing and entry of data from the documents continues to limit the attainable document processing speed and efficiency.

SUMMARY AND OBJECTS OF THE INVENTION

In accordance with the present invention, a further extension of the speed and efficiency of document processing is made possible by providing improved methods for automatically locating, extracting and recognizing data on documents, and most particularly to improved methods which can advantageously operate at the high speeds required for use in financial document processing systems, such as those involving checks, invoices and remittance documents U.S. Pat. Nos. 4,449,239; 4,201,978; 4,468,808; 4,918, 740; 4,523,330; 4,685,141; 3,832,682; and European patent EP-0,111,930 disclose various automatic data recognition approaches known in the art.

The specific nature of the invention as well as objects, features, advantages and uses will become evident from the following detailed description along with the accompanying drawings.

DETAILED DESCRIPTION

Like numerals and characters refer to like elements throughout the figures of the drawings.

For the purposes of this detailed description, the present invention will be illustrated as applied to automatically recognizing the dollar amount (typically referred to as the "courtesy amount") on a check in a document processing system for processing financial documents. However, it is to be understood that the present invention is also applicable to other types of documents, as well as to other types of data recognition applications, financial and otherwise.

Figure 1:
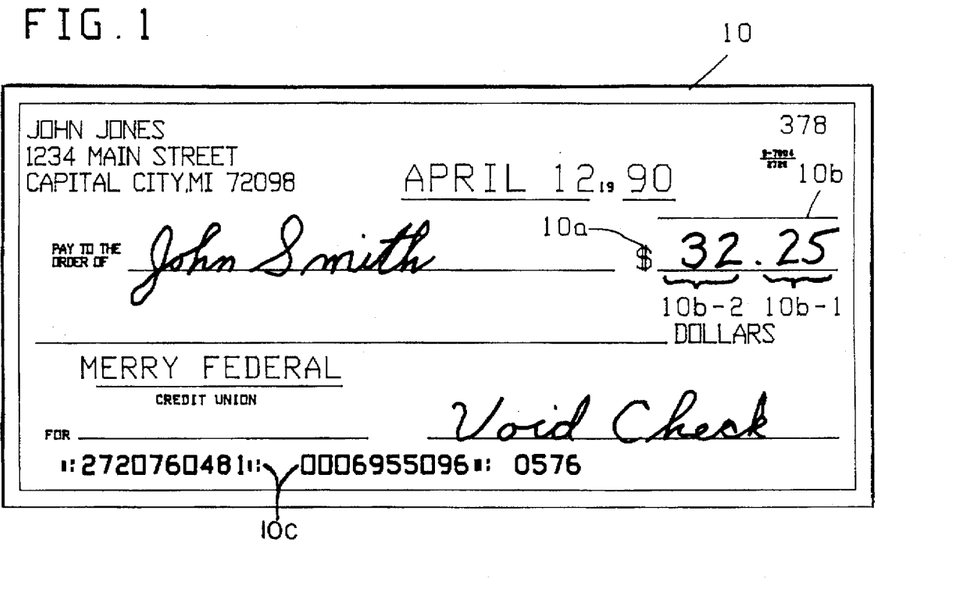
FIG. 1 illustrates a typical check of a type widely used in the United States.

Reference is initially directed to FIG. 1, which illustrates a check 10 of a type widely employed in the United States. The check 10 has a "$" currency symbol 10a, and an associated amount 10b, which is typically referred to in the banking industry as a "courtesy amount." A reader which recognizes this courtesy amount is typically referred to as a courtesy amount reader (CAR). The courtesy amount 10b may be machine printed or handwritten, as shown in FIG. 1.

The typical check 10 shown in FIG. 1 also includes encoded machine readable data 10c at the bottom-left of the check, which serves to provide identifying information such as the identity of the bank on which the check is drawn, the customer's account number, and the check number. Typically, this encoded machine readable data 10c is provided in magnetic ink and is referred to by the acronym "MICR" (magnetic ink character recognition).

Figure 2:
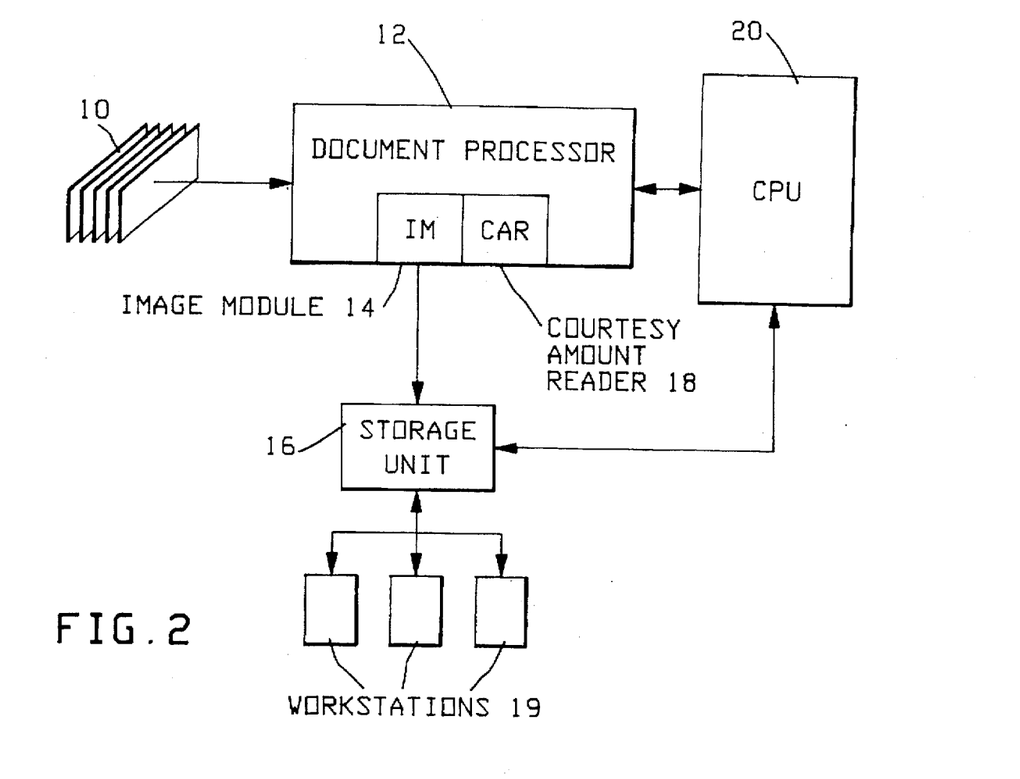
FIG. 2 generally illustrates a document processing system in which the present invention may be incorporated.

FIG. 2 generally illustrates a document processing system in which the present invention may be incorporated. The documents to be processed are typically financial documents, including checks of the type illustrated in FIG. 1. As illustrated in FIG. 2, these financial documents 10 are applied to a document processor 12, which, in a conventional manner, machine reads encoded data from the documents, captures and processes images of the documents, and sorts the documents into pockets (not shown).

The document processor 12 in FIG. 2 includes an imaging module 14 for capturing images of documents, processing and compressing the captured document images, and then transmitting the compressed document images to storage apparatus 16, such as disk drives. Workstations 19 receive document images from the storage apparatus 16 for display and entry of data by workstation operators, such as courtesy amounts from the viewed images. A computer processing unit (CPU) 20 provides for overall control of the system, and also for maintaining a data base for document information transmitted thereto by the document processor 12 and workstations 19 (via the storage apparatus 16).

The document processor 12 of FIG. 2 additionally includes a courtesy amount reader 18 coupled to the imaging module 14 for automatically recognizing courtesy amounts on checks, such as illustrated in FIG. 1. An important advantage of providing such a courtesy amount reader 18 in the document processing system of FIG. 1 is that those checks whose amounts are successfully read need not have their courtesy amounts read and entered by viewing their images at the workstations 18.

The courtesy amount reader (CAR) 18 typically comprises a plurality of microprocessors, RAMs, ROMs and other associated circuitry, along with appropriate programming, for operating on document images applied thereto from the image module 14, in order to provide for automatic recognition of the courtesy amounts in accordance with the invention. The manner in which such may be provided for the CAR 18 will become evident from the disclosure herein.

Figure 3:
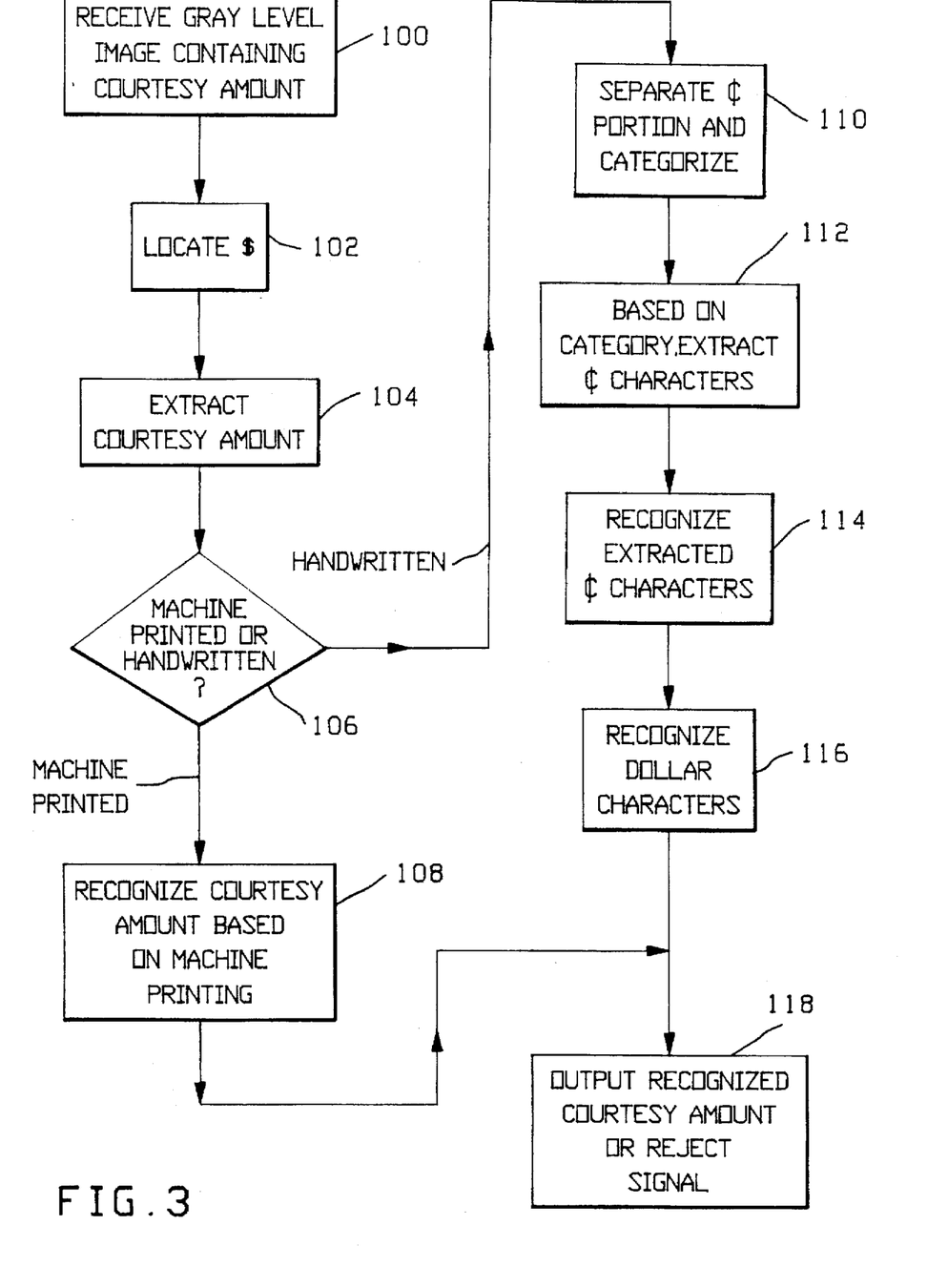
FIG. 3 is a flow chart generally illustrating the various operational steps performed by an automatic courtesy amount reader in accordance with the invention.

FIG. 3 is a flow chart generally illustrating the various operational steps performed by the CAR 18 in FIG. 2 in recognizing a courtesy amount on a check. It is to be understood that this flow chart is presented by way of example, and should not be considered as limiting the scope of the invention. For example, certain steps shown herein may be omitted, other steps may be added, and/or the arrangement of the steps may be modified.

As indicated by Step 100, the CAR 18 receives a gray level image of a check from the imaging module 14 in FIG. 2. The CAR locates the "$" 10a in FIG. 1 (Step 102), and then extracts the associated courtesy amount 10b (Step 104). A determination is then made as to whether the extracted courtesy amount is machine printed or handwritten (Step 106). If machine printed, a relatively simple recognition of the courtesy amount is performed (Step 108) and the result outputed (Step 118).

If the extracted courtesy amount is determined to be handwritten (Step 106), a more complex analysis is required. In such case, the "¢" portion 10b-1 (FIG. 1) is first separated and categorized (Step 110), and the "¢" characters then extracted based on the categorization (Step 112). The resulting extracted "¢" characters are then "¢" recognized (Step 114).

After the "¢" characters have been successfully recognized (Step 114), the dollar characters are recognized (Step 116). The CAR 18 (FIG. 2) then outputs the recognized courtesy amount, or a reject signal (Step 118). In the system of FIG. 2, this CAR output is sent to the CPU 20. If a reject condition is detected during any of the steps in FIG. 3, a reject output is immediately provided and the remaining steps aborted. As shown in FIG. 3, extraction and recognition of the "¢" portion of the courtesy amount are performed prior to the dollar portion, since it is more likely to produce a reject. It will be understood that the recognized courtesy amount output provided by the CAR can be accompanied by a confidence value based on confidence indications produced during the recognition process. It will also be understood that the recognition Steps 106, 108, 114 and 116 in FIG. 3 can be provided using known recognition techniques, such as disclosed in the aforementioned patents.

A description of each of the steps illustrated in FIG. 3 is set forth below.

Step 100 (FIG. 3)

Figure 5:
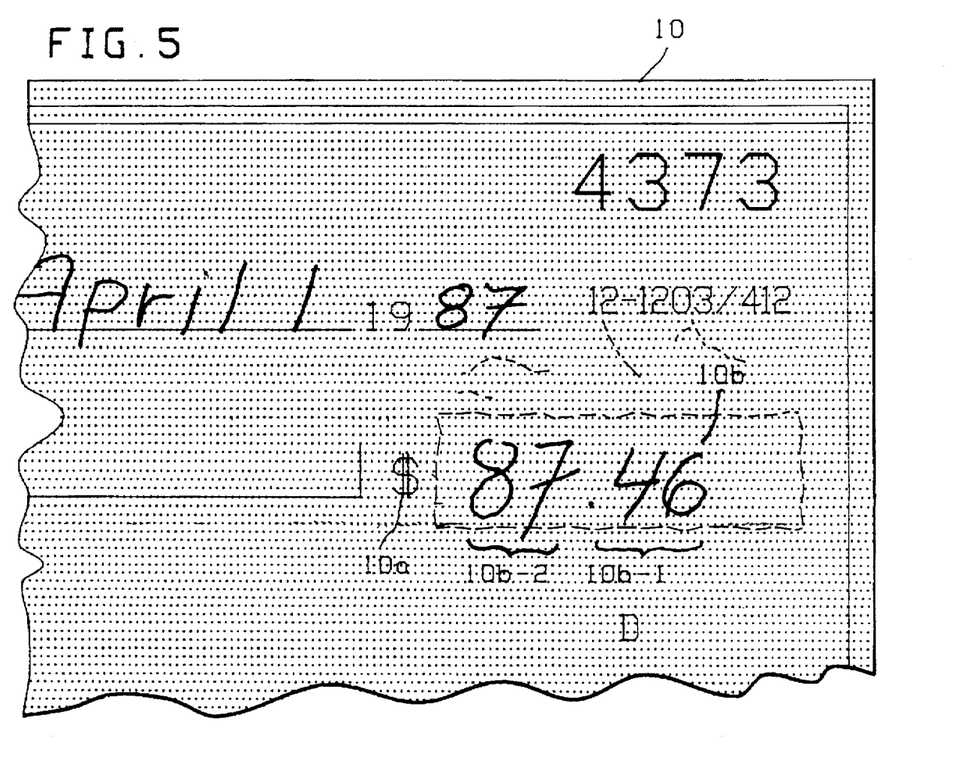
FIG. 5 is a typical gray level image provided by the image module 14 of FIG. 2.

During this step, the imaging module 14 in FIG. 2 provides a gray scale image (such as illustrated in FIG. 5) to the CAR 18 of at least the portion of a check containing the "$" character 10a and the associated courtesy amount 10b. It is to be understood that the size illustrated in FIG. 5 is by way of example only.

Step 102 (FIG. 3)

During this step, the "$" character 10a (FIG. 5) is located. Obviously, a currency character other than the "$" could be used as a location character, such as an asterisk "*" or other appropriate symbols.

Step 104 (FIG. 3)

During this step, the courtesy amount 10b (FIG. 5) is extracted using the previously located "$" character 10a as a location guide.

Step 106 (FIG. 3)

During this step, a determination is made as to whether the extracted courtesy amount is machine printed or handwritten. If it is machine printed, operation proceeds to Step 108. If it is handwritten, operation proceeds to Step 110.

Step 108 (FIG. 3)

If the courtesy amount is determined to be machine printed, a relatively simple recognition is made based on the type of machine printing recognized.

Step 110 (FIG. 3)

If the courtesy amount is determined to be handwritten, a more complex analysis is required, which begins with the separation of the "¢" portion 10b-1 (FIG. 5) from the dollar portion 10b-2. The separated "¢" portion is then categorized.

Step 112 (FIG. 3)

During this step the "¢" characters are extracted based on the categorization made in Step 110.

Step 114

During this step the extracted "¢" characters are recognized.

Step 116 (FIG. 3)

During this step, the "$" characters 10b-2 (FIG. 5) of the courtesy amount are recognized to complete recognition of the courtesy amount.

Step 118 (FIG. 3)

During this step, the CAR 18 outputs (to the CPU 20 in FIG. 2) the recognized courtesy amount, or a reject signal. A reject signal is provided by the CAR if a reject condition is detected during any of the previous steps, in which case subsequent steps are aborted. A recognized courtesy amount may also be accompanied by a confidence value.

Various ones of the steps shown in FIG. 3 will now be considered in detail.

Detailed Description of Step 102

Figure 4:
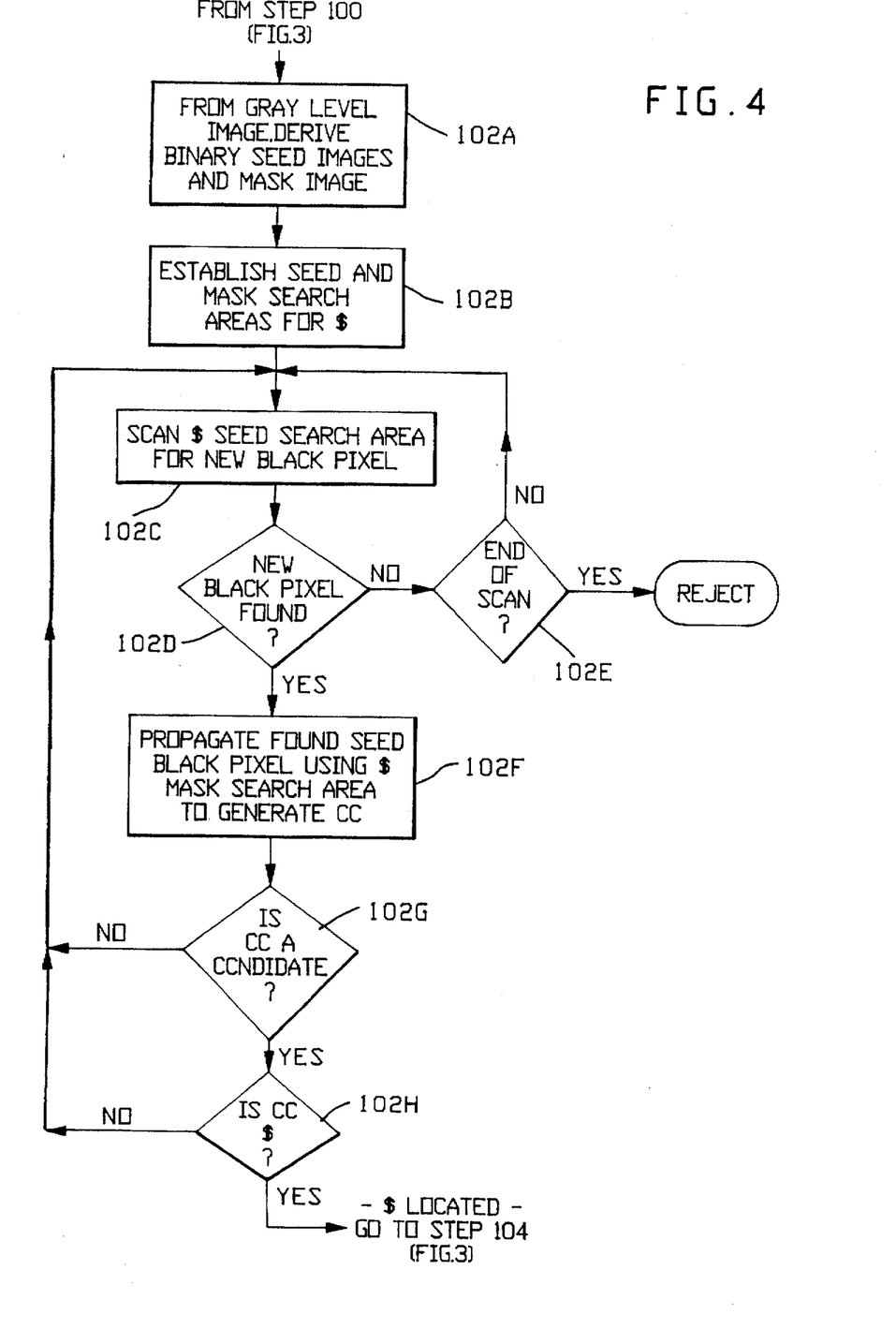
FIG. 4 is a flow chart illustrating a preferred manner for accomplishing the "Locate $" Step 102 of FIG. 3.

A preferred manner for accomplishing Step 102 in FIG. 3, in accordance with the invention, will next be considered with reference to steps 102A through 102H in FIG. 4. It will be remembered that the purpose of Step 102 is to locate the "$" character 10a on the check 10 in FIG. 5.

Step 102A (FIG. 4)

During this step, a thresholding is used to derive a plurality of binary images from the gray level image (FIG. 5) provided by the image module 14 in FIG. 2. The derivation of these binary images will be understood by noting that a gray level image may typically be represented electronically as an X-Y matrix of pixels (picture elements), where each pixel has one of a plurality of gray level values. For example, each pixel could be provided with sixteen gray level values represented by 4 bits corresponding to the binary numbers 0 to 15, where 15 is black and 0 white. Each derived binary image is produced by employing a different one of these gray level values as a threshold in converting the gray level image to the binary image. For example, if a threshold of eight is used for producing a particular binary image, then that binary image will have black pixels for those pixels whose gray level values are eight or greater, all other pixels of the binary image being white.

For the particular embodiment of the invention being considered herein, three binary images are derived from the gray level image (FIG. 5) using three different thresholds, high, intermediate and low. The high threshold binary image will be referred to as the "$" seed image, the intermediate binary image will be referred to as the courtesy amount seed image, and the low threshold binary image will be referred to as the mask image. As will hereinafter be explained, the "$" seed image is used for locating the "$" character 10a (FIG. 5), the courtesy amount binary image is used for extracting the courtesy amount 10b, and the mask image is used for both purposes.

Figure 6:
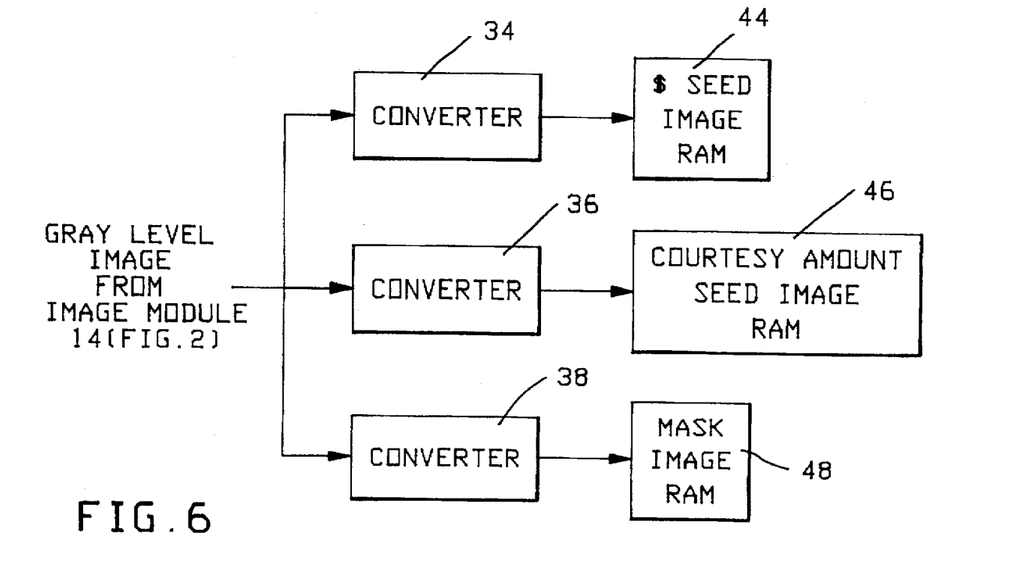
FIG. 6 is a block diagram illustrating apparatus for the parallel generation and storage of seed and mask binary images from the gray level image represented on FIG. 5.

As illustrated in FIG. 6, in order to increase recognition speed, the seed and mask images can be generated in parallel by respective converters 34, 36 and 38 as the gray level image is received from the image module 14 in FIG. 2, the resulting binary images being retrievably stored in respective random access memories (RAMs) 44, 46 and 48.

Step 102B (FIG. 4)

Figure 7:
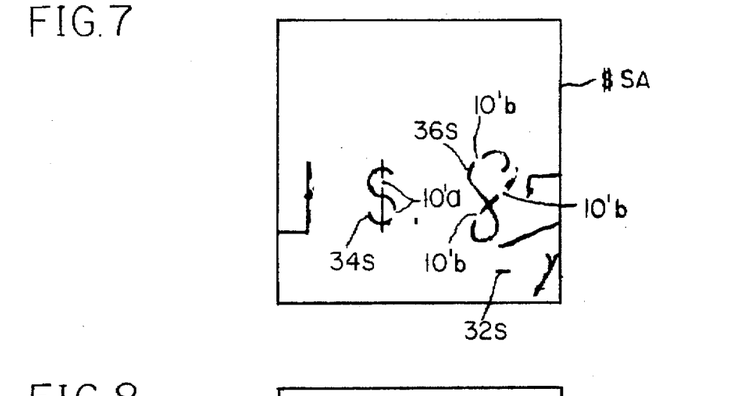
FIG. 7 illustrates a typical "$" seed search area $SA established by Step 102B in FIG. 4.
Figure 8:
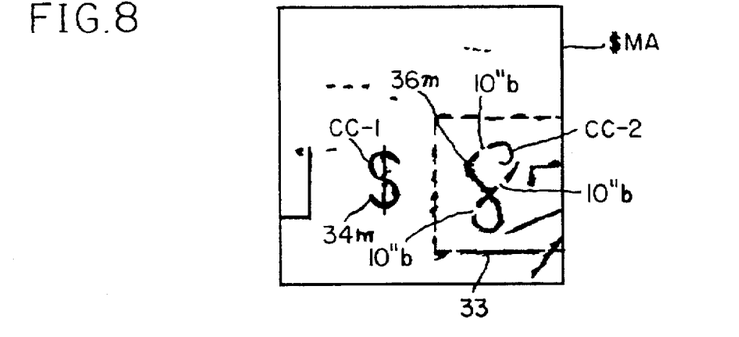
FIG. 8 illustrates a typical "$" mask search area $MA established by Step 102B in FIG. 4.

During this step, search areas on the "$" seed and mask images are established for use in locating the "$" character. FIG. 7 illustrates an example of a "$" seed image search area $SA for the seed image, and FIG. 8 illustrates an example of a "$" mask search area $MA for the mask image. FIGS. 7 and 8 also illustrate the effects produced by using different thresholds for deriving the seed and mask images. In this regard, note that the "$" mask search area $MA in FIG. 8 (because of the lower threshold used) contains many more extraneous black pixels (noise) than does the "$" seed search area $SA in FIG. 7.

For the purpose of the particular embodiment being considered, it will be assumed that the desired "$" seed search area $SA in FIG. 7 is known. For example, its location could be previously stored in the CPU 20 (FIG. 2), or could be derived from reading the machine-readable line 10c on the check 10 (FIG. 1). Alternatively, provision could be made for searching the entire image until the "$" character is located.

Steps 102C, 102D and 102E (FIG. 4)

During step 102C, the "$" seed search area $SA in FIG. 7 is scanned for a "new" black pixel. As will be explained, hereinafter, a "new" black pixel is one which has not yet been accounted for in the seed search area $SA. Typically, vertical column-by-column scanning is employed, since it is advantageous in locating the "$" character that it be encountered before the amount characters. If, during a scan, a new black pixel is not found (Step 102D), then a determination is made (Step 102E) as to whether the last vertical column of the "$" seed search area $SA in FIG. 5 has been scanned. In such case, a reject is produced. It is also to be understood that a reject could also occur if the maximum time alloted for the recognition process has expired. This is done in order to prevent the recognition process for any one check from exceeding a time which would be inconsistent with check processing speed requirements.

If during Step 102E it is determined that vertical scanning has not been completed, operation returns to Step 102C to continue the search for a new black pixel in the scan direction of the "$" seed search area $SA.

Steps 102F, 102G and 102H (FIG. 4)

If a new black pixel is found during Step 102D, operation proceeds to Step 102F. During Step 102F, the found seed black pixel (Step 102D) in the "$" seed search area $SA (FIG. 7) is propagated using the "$" mask search area $MA (FIG. 8) to generate a connected group of pixels which will hereinafter be referred to by the symbol CC. The manner in which a CC is generated will next be explained.

Reference is first directed to the "$" seed search area $SA in FIG. 7. It will be seen that the "$" character 10a is approximately complete, but with various breaks, such as illustrated at 10'a, while the adjacent "8" numeral of the courtesy amount 10b has more and wider breaks 10'b. This is to be expected since the "$" character normally has a significantly higher contrast than the courtesy amount characters and is produced using a higher quality printing process. Also note that, because of the relatively high threshold used to derive the "$" seed image (as described previously), the "$" seed search area $SA in FIG. 7 contains only a few widely spaced extraneous black pixels such as 32s.

Reference is next directed to the "$" mask search area $MA in FIG. 8, which is derived using a lower threshold (as described previously). It will be seen that, because of the lower thresholding, the "$" character 10a is complete, while the adjacent "8" of the courtesy amount 10b still contains some breaks 10"b. Also, there are significantly more extraneous black pixels such as 32m in the "$" mask search area $MA in FIG. 8 than in the "$" seed search area $SA in FIG. 7. In addition the "$" mask search area $MA contains black pixels from the courtesy amount border 33.

Steps 102D and 102F in FIG. 4 take advantage of both of the "$" seed and mask search areas $SA and $MA (FIGS. 7 and 8, respectively) to locate and recognize the "$" character. More specifically, when a new black pixel is found in the "$" seed search area $SA in FIG. 7 (Step 102D), the pixel having a corresponding location in the "$" mask search area $MA in FIG. 8 is located. For example, if 34s in FIG. 7 is the new black pixel found in the "$" seed search area $SA (Step 102D), then the correspondingly located black pixel 34m in the "$" mask search area $MA in FIG. 8 is located. This can be implemented using the seed and mask images stored in the respective "$" seed and mask RAMs 44 and 48 in FIG. 6, which may be organized for example, so that corresponding seed and mask pixels have corresponding addresses.

The next operation which takes place in the performance of Step 102F is to propagate the black pixel 34m (FIG. 8) in the "$" mask search area $MA so as to generate a CC comprised of all black pixels connected to 34m. This may be accomplished, for example, using the mask RAM 48 in FIG. 6. Starting with the black pixel 34m (FIG. 8), a determination is made as to whether there are any black pixels at addresses corresponding to pixel locations immediately adjacent the black pixel 34m (FIG. 8). A like determination is made for each newly determined black pixel, and then repeated again and again until all connected black pixels forming the CC have been identified. The addresses of these identified black pixels then constitute the CC generated from the black pixel 34m. The mask RAM 46 in FIG. 6 may, for example, be used to store the addresses of the identified black pixels forming a CC.

Still with reference to FIGS. 7 and 8, it will be understood that, if the new pixel found in the "$" seed search area $SA in FIG. 7 (Step 102D) is the black pixel 34s of the "$" character 10a, then the resulting CC produced by propagation of the corresponding black pixel 34m in the "$" mask search area $MA in FIG. 8 (Step 102F) will be CC-1, which is the "$" character 10a. This will be the case since all pixels of the "$" character in the "$" mask search area $MA in FIG. 8 are connected.

On the other hand, if it were to be assumed that the "$" character was absent and the new black pixel found in the "$" seed search area $SA (FIG. 7) was the pixel 36s of the numeral "8," then propagation of the corresponding black pixel 36m in FIG. 8 would generate CC-2, which will be seen to merely be the upper portion of the "8" because of the breaks 10"b.

Following generation of a CC in Step 102F, operation proceeds to Step 102G where the size, geometry, and location of the generated CC are used to make a relatively fast determination of whether it is an appropriate candidate for the "$" character, or should be rejected, thereby avoiding the relatively more time consuming recognition process.

Only if a CC is determined to be a "$" candidate (Step 102G) will operation proceed to Step 102H where conventional character recognition is performed to determine whether the CC is the "$" character. For example, the classifier approach described in the aforementioned U.S. Pat. No. 4,449,239 may be employed for recognition. If the CC is not determined to be an appropriate "$" candidate in Step 102G, or if the CC is not recognized to be the "$" in Step 102H, then operation returns to Step 102C to continue scanning for a new black pixel in the "$" seed search area $SA in FIG. 7. However, if the CC is recognized to be the "$" character in Step 102H, then the "$" character has been located. In such a case, no further scanning occurs, and operation proceeds to Step 104 in FIG. 3 to extract the courtesy amount.

As mentioned previously in connection with Step 102E, if no recognition of the "$" character is made when the end of the scan is reached, then a reject occurs. If it is desired that an additional search area be scanned for the "$" character, then, instead of producing a reject at the end of the scan, operation would proceed back to step 102B in FIG. 4 to establish the new seed and mask search areas. This scanning of additional search areas may be repeated as many times as desired, or until time out occurs.

From the foregoing description of Step 102F, it will be understood that the "new" black pixel referred to in Step 102C is one that was not previously found as a result of propagation in the "$" mask search area during Step 102F, since there is no need to propagate previously identified black pixels. There are various possible ways of preventing such previously identified seed pixels from being propogated in the "$" mask search area. In the embodiment being described, it has been found advantageous to accomplish this purpose by deleting seed pixels from the "$" seed image (stored in the "$" seed image RAM 44 in FIG. 6) upon identification of the corresponding pixel in the "$" mask search area $MA during mask propagation in Step 102F in FIG. 4. Accordingly, black pixels which were identified during previous propogations in Step 102F are not seen during scanning in Step 102C, thereby reducing the time required to locate the "$" character. This savings is in addition to the time saved because the seed image contains relatively few "noise" black pixels as a result of the high threshold used in its derivation.

It will also be understood that the above described seed/mask propagation approach for generating a CC is additionally advantageous for locating the "$" character 10a on a check 10 (FIG. 1), since the "$" character is normally printed with high quality and high contrast, and is unlikely to produce breaks in the "$" mask search area $MA (FIG. 8). Thus, submitting each generated CC for recognition, as described above (Steps 102G and 102H), makes it highly likely that the "$" character will be recognized, as compared to other markings or characters (such as the numeral "8" considered previously).

It is further to be understood that the seed/mask propagation approach for generating a CC is subject to many variations within the scope of the invention. For example, the definition of "connectivity" used for generating a CC could be changed in various ways to accommodate the recognition of particular types of characters under differing circumstances. For example, the definition of "connectivity" could be changed so that connectivity would be restricted to one or more particular directions (such as vertical, horizontal and/or particular diagonals). Another possible change in the definition of connectivity could permit a one (or more) pixel break to occur between "connected" pixels in particular circumstances.

Detailed Description of Step 104

Figure 9:
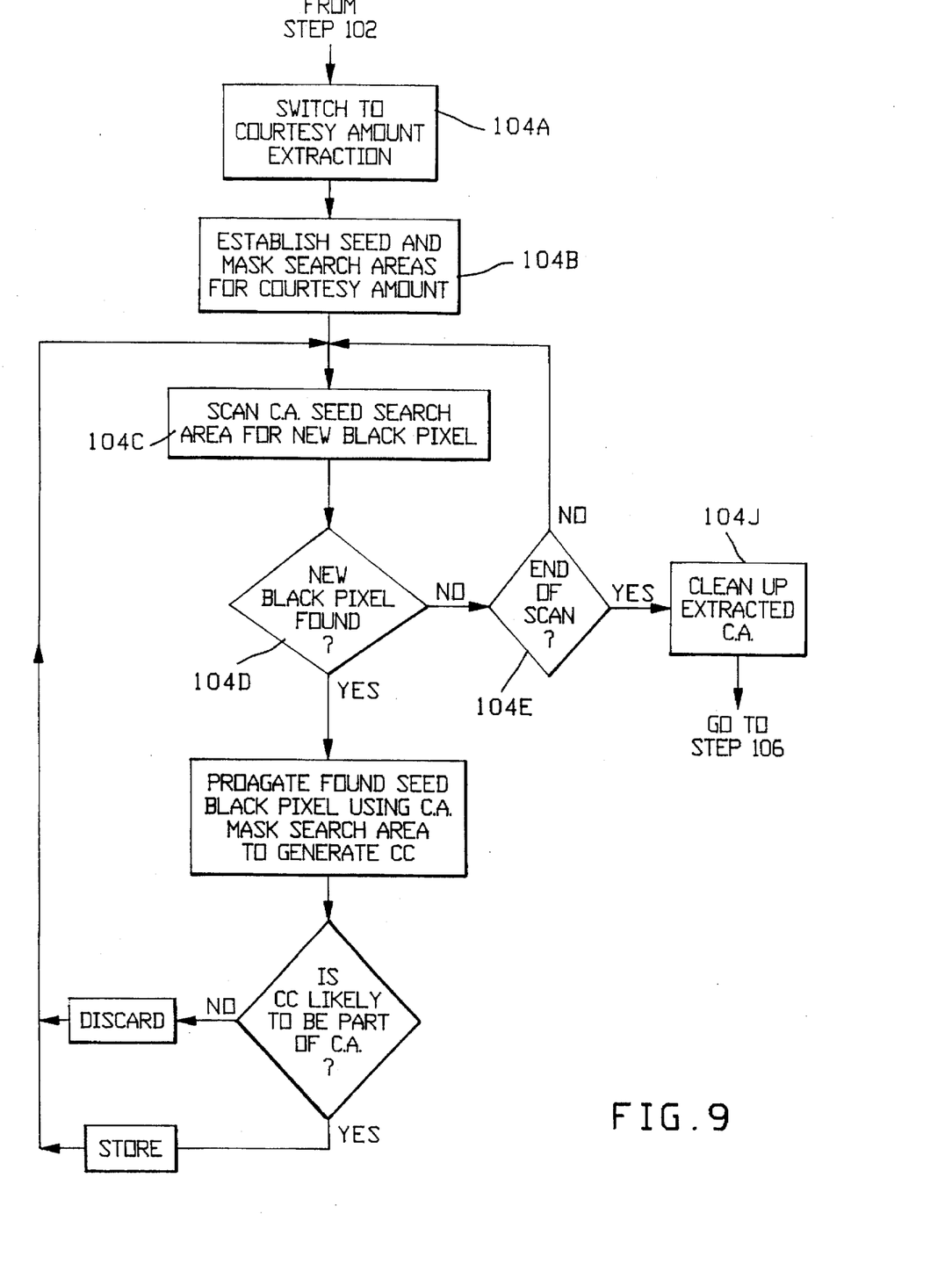
FIG. 9 is a flow chart illustrating a preferred manner for accomplishing the "Extract Courtesy Amount" Step 104 of FIG. 3.

A preferred manner for accomplishing Step 104 in FIG. 3 will next be considered with reference to Steps 104A through 104J in FIG. 9. It will be remembered that the purpose of Step 104 is to extract the courtesy amount 10b shown in FIG. 1.

Step 104A (FIG. 9)

During this step, operation switches to extracting the courtesy amount 10b (FIG. 5), the location of the courtesy amount having been determined based on having successfully located the "$" character 10a in Step 102 (FIGS. 3 and 4). It will become evident as the description of Step 104 progresses that the basic seed/mask approach described for locating the "$" in Step 102 is also used for courtesy amount-extraction, but in a somewhat different manner.

Step 104B (FIG. 9)

Figure 10:
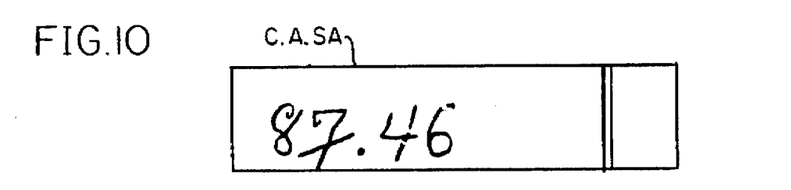
FIG. 10 illustrates a typical courtesy amount seed search area C.A.SA established by Step 104B in FIG. 9.
Figure 11:
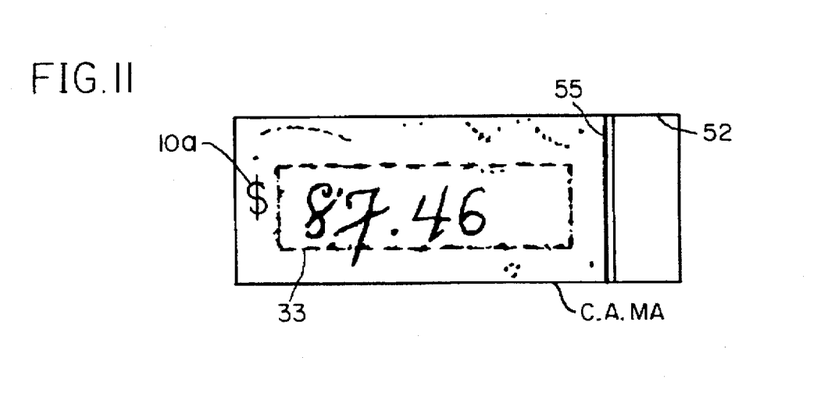
FIG. 11 illustrates a typical courtesy amount mask search area C.A.MA established by Step 104B in FIG. 9.

During this step, seed and mask search areas are established for extraction of the courtesy amount based on having determined the location of the "$" character in Step 102 of FIG. 3. FIG. 10 illustrates an example of a courtesy amount seed search area C.A.SA, while FIG. 11 illustrates an example of a somewhat larger courtesy amount mask search area C.A.MA. Note that C.A.MA in FIG. 11 is of sufficient size to include courtesy amount portions which might project beyond the courtesy amount border 33. Also note in this regard that, even though the "7" of the courtesy amount is not fully contained in the courtesy amount search area C.A.SA in FIG. 10, the "7" will be fully extracted as a result of seed/mask propagation in the larger courtesy amount mask search area C.A.MA in FIG. 11.

In the preferred embodiment being described herein, the same mask image (stored in RAM 48 in FIG. 6) is used for amount extraction as is used for location of the "$;" however, the courtesy amount seed image (stored in RAM 46 in FIG. 6) is used for amount extraction instead of the "$" seed image (in RAM 44) used for locating the "$" character. This is done because the "$" seed image threshold is chosen to be high to take advantage of the high contrast "$" character, as explained previously, and would not be appropriate for the courtesy amount characters which have a greater range of contrast variations. FIG. 10 illustrates an example of a possible choice of a threshold for the courtesy amount seed search area C.A.SA, wherein the border 33 (FIG. 5) as well as low contrast extraneous pixels (noise) do not appear. In this regard, it is to be understood that all parts of the courtesy amount need not be included in the courtesy amount search are C.A.SA IN FIG. 10. It is merely required that sufficient portions of the courtesy amount be included in C.A.SA in FIG. 10 to provide for adequate extraction of the courtesy amount as a result of seed/mask propagation in C.A.MA in FIG. 11.

Steps 104C, 104D, 104E and 104F (FIG. 9)

These steps may be generally the same as previously described for respective Steps 102C, 102D, 102E and 102F, in FIG. 4, except that for a normal courtesy amount, there is no reject after the end of the scan (Step 102E), operation instead proceeding to Step 106 (FIG. 3). Steps 104C, 104D, 104E and 104F will thus not be considered in detail. It will be sufficient to note that, each time a "new" black pixel is found during scanning of the courtesy amount seed search area C.A.SA (FIG. 10), propagation in the courtesy amount mask search area C.A.MA (FIG. 11) generates a CC (as previously defined).

Step 104G (FIG. 9)

Similar to Step 102G in FIG. 4, this step tests whether the CC generated in Step 104F is appropriate based on the size, geometry and location of the CC. For the purposes of courtesy amount extraction, this test in Step 104G determines-whether the generated CC is likely to be a part of the courtesy amount. For example, a useful basis for determining whether a generated CC is a likely part of the courtesy amount is to determine whether it extends to the border 52 (FIG. 11) of the courtesy amount mask search area C.A.MA as, for example, line 55 in FIG. 11. Such a generated CC is most unlikely to be a part of the courtesy amount.

Step 104H (FIG. 9)

If a generated CC is determined as not likely to be a part of the courtesy amount in Step 104G, then operation proceeds to Step 104H which discards the generated CC; operation then returns to Step 104C to continue scanning for a new black pixel in the courtesy amount seed search area C.A.SA in FIG. 10.

Step 104I (FIG. 9)

If a generated CC is determined to likely be a part of the courtesy amount in Step 104G, then operation proceeds to Step 104I which stores the generated CC (e.g. in RAM memory 46 in FIG. 6) for later use. Operation is then returned to Step 104C to continue scanning for a new black pixel in the courtesy amount seed search area C.A.SA in FIG. 10.

Figure 13:
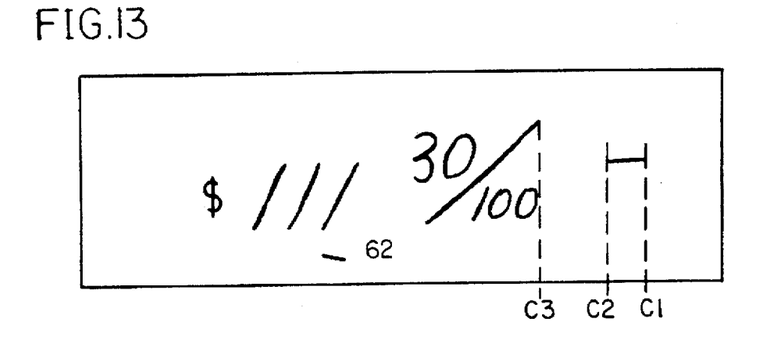
FIG. 13 illustrates a typical extracted courtesy amount (prior to clean-up in Step 104J in FIG. 9) containing extraneous connected component groups 62 and 63.

Before leaving Step 104I, it will be helpful to note the difference between the way generated CCs are used for locating the "$" character (Step 102, FIGS. 3 and 4), and for courtesy amount extraction and recognition. It will be remembered that, for locating the "$" character, each generated CC is considered as an entity for recognition purposes, since the "$" character is provided with high quality printing and normally has a high contrast and no breaks. However, a CC generated for courtesy amount extraction may be only a fragmentary portion of a character because courtesy amount characters may have several breaks, particularly when handwritten. Thus, a courtesy amount character may be comprised of a plurality of generated CCs. Accordingly, in extracting and recognizing the courtesy amount, no attempt is made to recognize a generated CC, as is done when locating the "$" character (Step 102H in FIG. 4). Instead, each CC which is determined as likely to be part of a courtesy amount is stored Step (104I) until the entire courtesy amount area has been scanned, at which time all generated CCs which are likely to be part of the courtesy amount will have been stored. These stored CCs then constitute the extracted courtesy amount. FIG. 13 is an example of such a stored courtesy amount extracted as described above. Thus, with respect to the courtesy amount, the seed/mask propagation approach for generating CCs primarily serves as a particularly advantageous way of extracting and storing the courtesy amount for recognition.

Step 104J (FIG. 9)

Typically, Step 104J is reached, via Step 104E (which tests for end of scan), after scanning of the courtesy amount seed search area C.A.SA (FIG. 10) has been completed and all generated CCs likely to be a part of the courtesy amount are stored. The purpose of Step 104J is to clean up this stored extracted courtesy amount (FIG. 13) by removing extraneous CCs, such as exemplified by 62 and 63. One approach used is to delete extraneous CCs, such as 62, if they are spaced a predetermined amount above and below the courtesy amount region. This may be accomplished, for example, by projecting the entire amount field horizontally to define a region having upper and lower boundaries. CCs, such as 62 in FIG. 13, above or below these boundaries are then deleted. If the projection creates a plurality of regions, the appropriate upper and lower boundaries are those corresponding to the region which includes the "$" character.

The removal of extraneous CCs, such as 63 in FIG. 13, located to the right of the courtesy amount, present a more difficult problem, since they may be a part of the courtesy amount. A particularly advantageous method for determining whether these CCs are extraneous is based on the condition that the horizontal spacing between the rightmost CC and the nearest black pixel to the left of the CC be a predetermined amount greater than the horizontal width of the CC. If this condition is met, then the CC is considered to be extraneous and is deleted. An example of how this condition may be implemented will be explained with respect to FIG. 13. For the purpose of this example, the courtesy amount region will be considered to be divided into columns, numbered from left to right, each column having a width equal to one pixel. First, the locations of the following columns are determined from the extracted courtesy amount:

C1=The rightmost column having a black pixel.

C2=The rightmost column of the next area of white columns with minimum width W left of C1.

C3=The next column to the left of C2, having a black pixel.

If the following condition is met:

$$(C2-C3) > K(C1-C2)$$

then all black pixel elements 63 which are deposed between C1 and C3 are deleted. Typically, W may have a width corresponding to the width of three columns, the choice of W being such that the above condition will not be met by portions of a single character. K may typically have a value of 1.5. These values of W and K are chosen to assure that the courtesy amount will not be mistaken for an extraneous CC. The above is iteratively repeated so long as the condition continues to be met. When the condition fails to be met, the testing terminates and operation proceeds to the next Step 106 in FIG. 3.

Figure 12:
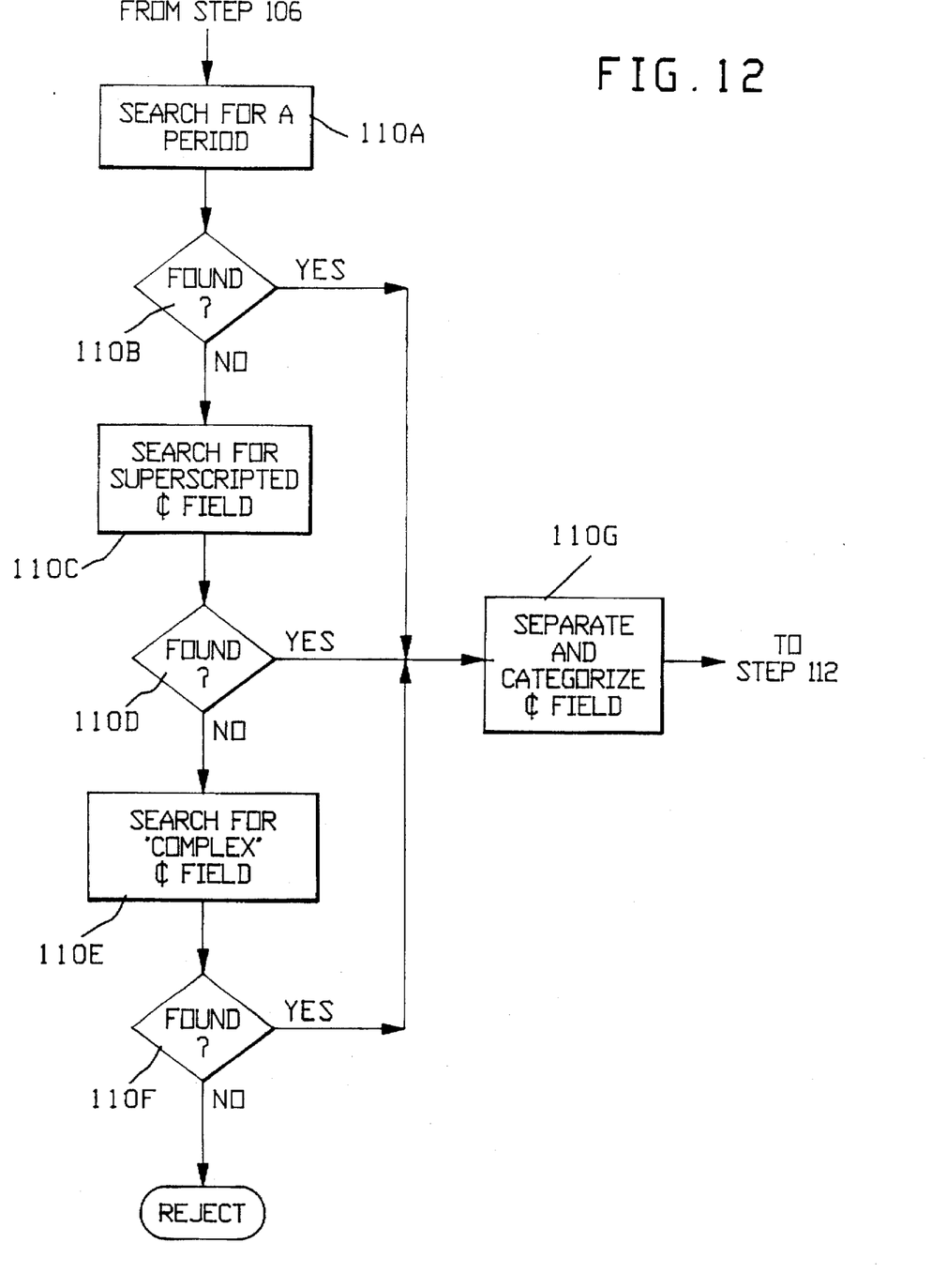
FIG. 12 is a flow chart illustrating a preferred manner for accomplishing the "separate ¢ portion and categorize" Step 110 of FIG. 3.

Detailed Description of Step 110 (FIG. 12)

It will be understood from FIG. 3, that Step 110 is reached if the courtesy amount extracted during Step 104 is determined to be handwritten. The purpose of Step 110 is to separate the "¢" portion 10b-1 (FIG. 1) from the dollar portion 10b-2 of the courtesy amount 10b. A preferred manner for accomplishing Step 110, in accordance with the invention, will next be considered with reference to Steps 110A through 110H in FIG. 12. The "$" portion and "¢" portion of the courtesy amount will hereinafter be referred to as the "$" field and "¢" field, respectively.

Step 110A (FIG. 12)

During Step 110A, the extracted courtesy amount is searched for the presence of a period or decimal point ("."). Such a period or decimal point is, of course, indicative of the separation between "$" and "¢" fields of the courtesy amount, and its detection can therefore be used as a basis for separating these fields.

A preferred method for detecting the presence of a period will be described with respect to FIG. 14. For this purpose, the extracted courtesy amount is investigated from left to right, such as by using column-by-column scanning of the image of the extracted courtesy amount stored in RAM memory 46 in FIG. 6.

Figure 14:
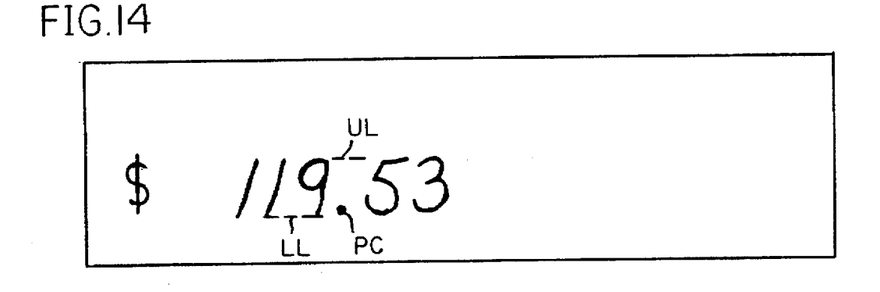
FIGS. 14–16 illustrate typical extracted courtesy amounts after clean-up in Step 104J in FIG. 9.

If a potential period candidate is found, such as PC in FIG. 14, an upper line UL and lower line LL (FIG. 14) are determined for the courtesy amount portion (such as the numeral "9" in FIG. 14) immediately to the left of PC. The lines are numbered from top to bottom. A potential period candidate PC is considered to be an actual period candidate if the following conditions are satisfied:

(1) The potential period candidate PC has a height which is no greater than ½ (UL-LL).

(2) The potential period candidate PC has a width W which is less than a prescribed amount.

(3) The average line number of the potential period candidate PC is less than ½(UL+LL).

Typically, up to three period candidates are permitted to be identified based on the above measurements. Operation then proceeds to Step 110B in FIG. 12.

Step 110B (FIG. 12)

During Step 110B, the up to three period candidates determined in Step 110A are investigated using well known statistical classification techniques, as disclosed, for example, in the aforementioned patents. If more than one period candidate is found to be acceptable, the rightmost one is chosen as a separator of the "$" and "¢" fields, and operation then proceeds to Step 110G in FIG. 12.

However, if no period at all is identified, then operation proceeds to Step 110C to try to separate the "$" and "¢" fields on another basis.

Step 110C (FIG. 12)

Figure 15:
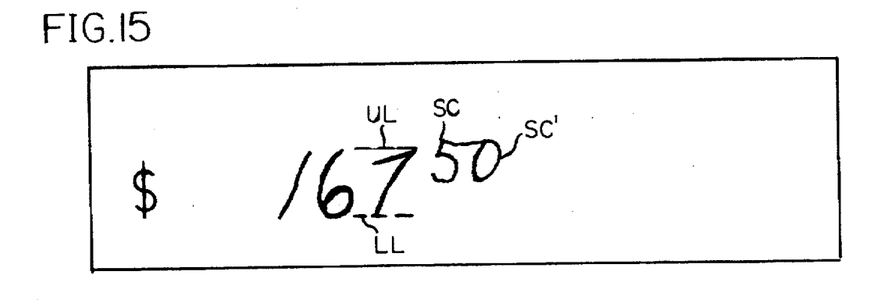

During Step 110C, superscripting of the "¢" field of a courtesy amount, such as illustrated in FIG. 15, is investigated as a basis for separation of the "$" and "¢" fields of the courtesy amount. For this purpose, the extracted courtesy amount is again investigated from left to right to detect the start of a superscripted character SC (for example, the numeral "5" in FIG. 15).

Similar to Step 110B, which describes the search for a potential period candidate, the upper line UL and lower line LL (FIG. 15) are determined for the courtesy amount portion (such as the numeral "7" in FIG. 15) immediately to the left of the candidate superscripted character SC. Again the lines are numbered from top to bottom. A candidate superscripted character SC is considered to be an actual superscripted character if the following conditions are satisfied:

(1) the bottom line number of the candidate superscripted courtesy amount character is no greater than ⅓(2LL+UL).

(2) the height of the candidate superscripted character SC is at least ⅓(LL-UL).

(3) the candidate superscripted character SC is separated from the courtesy amount portion immediately to the left (such as the numeral "7" in FIG. 15) by at least one white column. A white column is a column having no black pixels.

(4) courtesy amount portion SC' (the numeral "0" in FIG. 14) immediately to the right of the candidate superscripted courtesy amount character SC has a lower line number of no greater than the lower line number of SC plus half its height.

The first candidate which satisfies the above conditions is considered to be the start of a superscripted "¢" field.

Operation then proceeds to Step 110D in FIG. 12.

Step 110D (FIG. 12)

Step 110D receives the results of the search for a superscripted "¢" field performed in Step 110C. If a superscripted character was found, a basis for separation of the "$" and "¢" fields will have been determined, and operation proceeds to Step 110G.

However, if a superscripted "¢" field is not found, then operation proceeds to step 110E in FIG. 12 to find another basis for separation of the "$" and "¢" fields.

Step 110E (FIG. 12)

Figure 16:
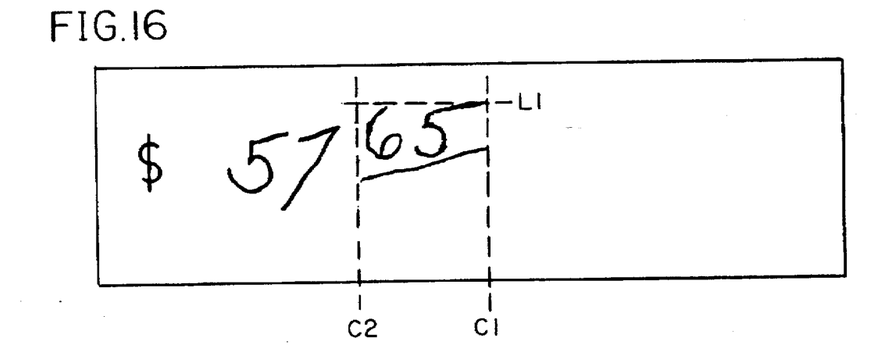
Figure 17:
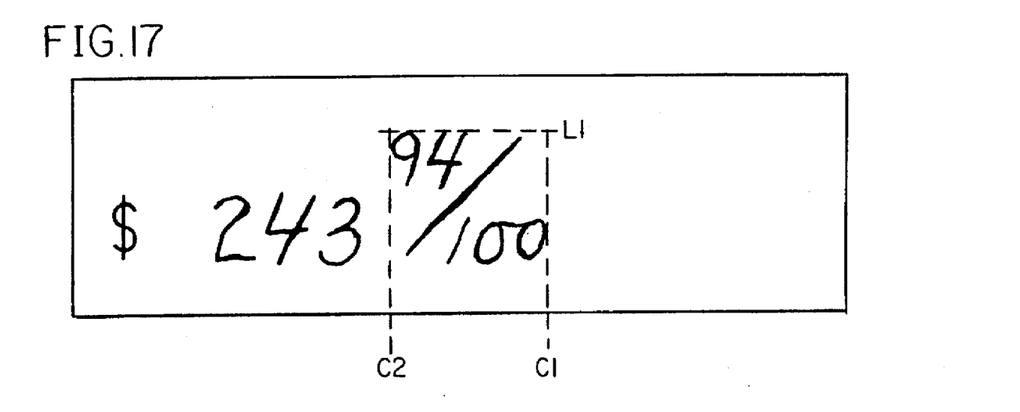
FIGS. 17–18 illustrate how "¢" characters are extracted from a "¢" field comprised of underlined double figures.

During Step 110E, the presence of a complex "¢" field, such as illustrated in FIGS. 16 and 17, is investigated as a basis for separation of the "$" and "¢" fields. It will be seen that FIG. 16 shows a first type of complex "¢" field comprised of two superscripted numerals having an underline. FIG. 17 shows a second type of complex "¢" field in which the "¢" amount is provided as a fraction.

To determine whether a complex "¢" field is present, the extracted courtesy amount is again investigated from right to left, as in previously described Steps 110A and 110C. In searching for a complex "¢" field, the following are determined (see FIGS. 16 and 17).

(1) The last occupied column C1 of the extracted courtesy amount.

(2) The first white column C2 to the left of the last occupied column C1.

(3) The first line L1 occupied by a courtesy amount portion located to the right of the white column C2.

As illustrated in FIGS. 16 and 17, the values of C1, C2 and L1 delineate a particular portion of the extracted courtesy amount for testing as to whether it is a suitable candidate for a complex "¢" field. Testing is accomplished using statistical classification techniques which are specifically designed to recognize various possible "¢" field types and, in particular, the complex "¢" field types illustrated in FIGS. 16 and 17. The manner in which such statistical classification techniques may be implemented will be evident from the abovementioned patents.

If a complex "¢" field is recognized, such as shown in FIGS. 16 and 17, then column C2 is considered to be the separating column between the "$" and "¢" fields. It will be remembered that C2 is the first white column to the left of the last occupied column C1.

The results of operation in Step 110E are then passed to step 110F in FIG. 12.

Step 110F (FIG. 12)

Step 110F receives the results of the search for a complex "¢" field performed in Step 110E. If a complex "¢" field was found, then column C2 serves as a-basis for separation of the "$" and "¢" fields, and operation proceeds to Step 110G in FIG. 12.

However, if a complex "¢" field is not found, then a reject occurs, since no basis has been found for separating the "$" and "¢" fields of the courtesy amount, and no further basis for separation. In this regard it is to be understood that additional bases for providing separation may also be provided.

Step 110G (FIG. 12)

It will be understood from the foregoing description of FIG. 12, that operation proceeds to Step 110G as a result of having found a basis for separating the "¢" and "$" fields of the courtesy amount, either based on finding the period (Steps 110A and 110B), finding a superscripted "¢" field (Steps 110C and 110D), or finding a complex "¢" field (Steps 110E and 110F).

Accordingly, Step 110G provides for separating the "¢" field using the particular basis found for separation (period, superscript or complex "¢" field).

Also during Step 110G, the separated "¢" field is categorized as being one of several types using statistical classifying techniques, such as disclosed in the aforementioned patents. Categories which may be provided by Step 110G for the preferred embodiment being described are double zeroes; double figures, underlined double figures and fraction. Other categories could also be provided.

If an acceptable category is determined in Step 110G, Operation proceeds to Step 112 in FIG. 12; otherwise a reject occurs.

Detailed Description of Step 112 (FIG. 3)

A preferred manner for accomplishing Step 112, in accordance with the invention, will next be considered. It will be remembered that the purpose of Step 112 is to extract the "¢" characters based on the category determined for the "¢" field.

Operation in Step 112 for the various categories provided in the preferred embodiment being described is explained below:

Double Zeroes

For this category, it is immediately known that the value of the "¢" field is zero, and thus operation proceeds to Step 116 in FIG. 3 without further processing. Typically, this category is used only where the basis for separation is detection of a period or superscripted "¢" field.

Double Figures

For this category, the "¢" field figures are directly available so that operation proceeds to Step 114 in FIG. 3 for their recognition without further processing. As for the "Double Zero" category, this category is typically used only where the basis for separation is detection of a period or a superscribed "¢" field.

Underlined Double Figures

Figure 18:
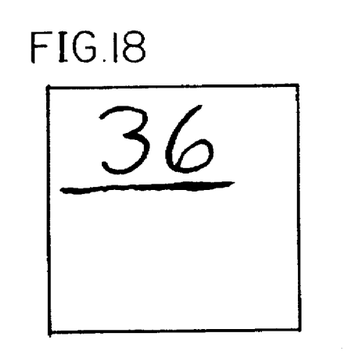
Figure 19:
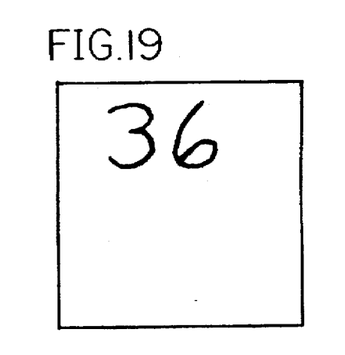
FIGS. 19–22 illustrate how "¢" characters are extracted from a "¢" field comprised of a fraction.

For this category, operations are directed to removing the underline so that only the "¢" characters remain, as illustrated in FIGS. 18 and 19 for a "¢" field comprised of an underlined "36". A preferred implementation for accomplishing this purpose is described below.

First, the slope of the underline is determined as follows. For each column of the "¢" field, the number of white pixels to the first black pixel is counted from the lower edge. If the difference of these numbers for two successive columns is greater in terms of amount than 4, then a position of discontinuity is present. All positions of discontinuity and the greatest column range between two positions of discontinuity in the "¢" field are determined. In this greatest column range, the underline is also expected. Two image coordinates points (x1, y1) and (x2, y2) are defined as follows:

x1=Start column of the column range.

y1=Number of white pixels from the lower edge to the first-black pixel in column x1.

x2=End column of the column range.

y2=Number of white pixels from the lower edge to the first black pixel in column x2.

The slope SL of the underline is then determined by the following equation:

$$SL=(y2-y1)/(x2-x1)$$

In order to delete the underline found, a family of n straight-lines-of-the slope SL and vertical spacing of 1 is formed. The number n of straight lines is dependent upon the slope of the underline and is established as follows:

n=11 for $0 \leq |su| < 0.5$ n=14 for $0.5 \leq |su| < 1$ n=25 for $1 \leq |su| < 2$ n=32 otherwise Furthermore, starting points are established on these straight lines for the scanning of the "¢" field from the right and from the left with the scanning step width 1 along the straight lines:

In the case of scanning from the left:

x1 (i)=first column of the "¢" field (for all straight lines)
y1 (i)=y_start+i−1 (for the ith straight line)

In this case, y_start is established so that (x1 y1) occurs under the scanning points of the first straight line.

In the case of scanning from the right:

xr (i)=Last column of the "¢" field (for all straight lines)
yr (i)=y_start+i−1 (for the ith straight line)

In this case, y_start is established so that (x2, y2) occur under the scanning points of the first straight line.

The "¢" field is scanned along these straight lines, with the objective of determining that straight line below which no useful information, occurs. For this purpose, the number of scanning points as far as the scanning point with the first black pixel in the "¢" field is counted for all scanning straight lines in the scanning from the right and from the left. Then, the straight lines with the maximum number of counted scanning points in the course of the scanning from the right and in the course of the scanning from the left are determined. From this range of straight lines, that one is selected which is lowest. All portions of the extracted "¢" fields below this lowest straight line are deleted, producing the result shown in FIG. 19. The above procedure also handles the situation where the "¢" characters intercept the underline.

After elimination of the underline (FIG. 19) the remaining "¢" field components ("36" in FIG. 19) are again examined using statistical classification techniques to determine whether it is in a double zero or double figures category. If the category is double zero, operation proceeds to Step 116, since the value of the "¢" field is known to be zero. If the category is double figures, operation proceeds to Step 114 for recognition of the double figures. If neither category is found, a reject occurs.

Fraction

Figure 20:
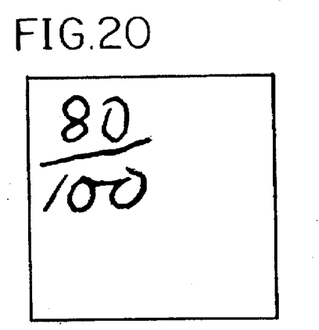
Figure 21:
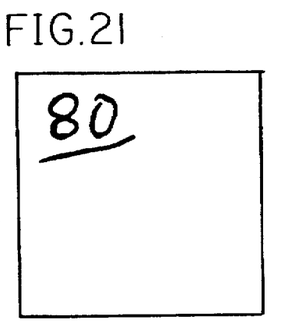
Figure 22:
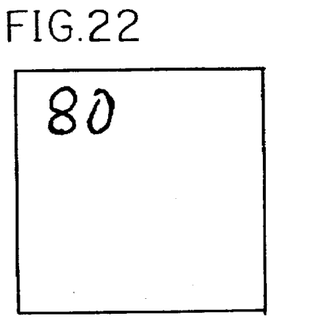

For this category, operation is directed to first removing the denominator, and then removing the fraction line, as illustrated in FIGS. 20, 21 and 22 for a "¢" field comprised of a fraction having a numerator "80" and a denominator "100." A preferred implementation for accomplishing this purpose is described below.

First, the field is investigated to a column range within which the fraction line is expected. This may be accomplished, for example, by determining the connected component group CC having the greatest width. Once the fraction line has been found, its slope is determined by finding the coordinates x1, y1, x2, y2 and calculating the slope in the same manner as previously described for the underlined complex "¢" field.

A straight dividing line is now established, above which as far as possible only the numerator and the fraction line are situated. This straight dividing line is determined by the slope and by the coordinates (x1, y1+offset) with offset=2 for $0 \leq |sb| < 0.5$
offset=3 for $0.5 \leq |sb| < 1$
offset=7 for $1 \leq |sb| < 2$
offset=10 otherwise.

Having thus established the straight dividing line, the "¢" field components below this dividing line are deleted, which for the fraction example illustrated in FIG. 19 will result in the denominator "100" being deleted. Thus, the "¢" field components remaining will be the underlined "80" shown in FIG. 21.

Accordingly, since the fraction operations so far should have resulted in underlined double zeroes or double figures, as illustrated in FIG. 21, the remaining "¢" field components are examined using statistical classification techniques to determine whether these remaining components, in fact, correspond to this underlined double zeroes or underlined double figures. If so, operation continues as previously described above for the underlined complex "¢" field category to extract the "¢" characters (FIG. 22); if not, a reject occurs.

While the invention has been described herein with respect to particular preferred embodiments, it is to be understood that many modifications and variations in implementation, arrangement and use are possible within the scope of the invention. For example, the number and type of seed and mask images and search areas employed may be varied, as well as the number and types of classification categories. Furthermore, it is to be understood that the seed and mask images need not be limited to binary (two-level) images. For example, a mask image might itself be a gray level (multiple level) image in order to provide additional information useful for courtesy amount extraction, "¢" field separation and/or recognition. Also, processing steps may be added to provide additional features, or described steps removed or rearranged. In addition, the invention can be adapted to a wide variety of applications besides those described herein. Accordingly, the claims following are to be considered as including all possible modifications and variations coming within the scope defined thereby.

What is claimed is:

1. In an electronically implemented method for recognizing the characters of a financial amount on a document, wherein said financial amount comprises an integer portion and a fractional portion having a plurality of possible fraction portion representations, the steps comprising:

producing a digital image representation corresponding to said financial amount, investigating said digital image representation to locate extraneous image portions not part of said financial amount;

removing said extraneous image portions based on their location with respect to said financial amount;

investigating said digital image representation to find at least one of a plurality of types of distinguishing separation characteristics with respect to said integer and fractional portions;

separating said integer and fractional portions based on finding during said investigating one of said distinguishing separation characteristics;

rejecting further recognition operations if none of said distinguishing separation characteristics is found;

categorizing a separated fraction portion using statistical classification techniques into one of a plurality of categories, each category corresponding to a different one of said plurality of possible fraction portion representations; and extracting the characters in a separated fraction portion based on said categorizing.

2. The method of claim 1, wherein said digital image representation is a binary representation.

3. The method of claim 1, wherein one of said plurality of types of distinguishing separation characteristics is the presence of a period between said integer and fractional portions of said financial amount, and wherein said investigating determines the presence of said period based upon the size and location thereof.

4. The method of claim 3, wherein a plurality of period candidates are investigated, and wherein a period candidate is considered to be a period if its height is no greater than one-half the height of an adjacent character, its width is less than a prescribed amount, and its average position does not extend above the center of said adjacent character.

5. The method of claim 1, wherein one of said plurality of types of distinguishing separation characteristics is the presence of superscripted characters in said fractional portion, and wherein said investigating determines the presence of said superscripted characters based upon the size and location thereof.

6. The method of claim 1, wherein one of said plurality of types of distinguishing separation characteristics is the presence of a complex field in said fractional portion, and wherein said investigating determines the presence of said complex field using statistical classification techniques.

7. The method of claim 6, wherein said complex field comprises underlined characters.

8. The method of claim 6, wherein said complex field comprises a fraction.

9. The method of claim 1, wherein said plurality of types of distinguishing separation characteristics include the following types: a) the presence of a period between said integer and fractional portions, b) the presence of superscripted characteristics in said fractional portion, and c) the presence of a complex character field in said fractional portion.

10. The method of claim 9, wherein said investigating of said image representation to find at least one type of distinguishing separation characteristic is performed sequentially for each type with the investigating of the presence of said complex field occurring last.

11. The method of claim 10, wherein the presence of a period is determined first.

12. The method of claim 10, wherein said complex field is located by considering the row of characters of the financial amount to be divided into a plurality of columns beginning at the integer portion of the row and ending at the fractional portion of the row, wherein a complex field is the image portion located between the last column having an image portion and the first column from the fractional end of the row having no image portion, and wherein the thus located complex field is tested for acceptability using statistical classification techniques.

13. The method of claim 1, wherein said integer portion corresponds to dollars and said fractional portion corresponds to cents.

14. The method of claim 1, wherein said plurality of categories includes double zeroes.

15. The method of claim 1, wherein said plurality of categories includes double figures.

16. The method of claim 1, wherein said plurality of categories includes underlined double figures comprised of two adjacent numerals with an underline below.

17. The method of claim 16, wherein said extracting includes determining the location and slope of said underline and deleting the underline.

18. The method of claim 1, wherein said plurality of categories includes a fraction comprising a numerator, a denominator and a fraction line therebetween.

19. The method of claim 18, wherein said extracting includes determining the location and slope of said fraction line, and deleting the denominator below said fraction line and the fraction line.

20. The method of claim 1, wherein said plurality of categories includes double figures, underlined double figures and a fraction comprising a numerator, a denominator and a fraction line therebetween.

21. The method of claim 1, wherein said financial amount comprises a row of adjacent characters, and wherein the step of removing extraneous image portions comprises projecting said characters along said row to define a region encompassing said characters and having upper and lower boundaries; and then deleting said extraneous image portions if they are spaced a predetermined amount above and below said boundaries.

22. The method of claim 21, wherein said extraneous image portions include one or more extraneous side image portions located adjacent a side of said row, and wherein said removing includes deleting an extraneous side image portion based on the condition that the spacing between the nearest portion of said financial amount and said extraneous side image portion is a predetermined amount greater than the width of said side image portion.

23. The method of claim 22, wherein said deleting is iteratively repeated so long as said condition continues to be met.

24. In an electronically implemented method for recognizing a financial amount on a document, said financial amount comprising a row of adjacent characters, the steps comprising:

producing a digital image representation corresponding to said financial amount said image representation including extraneous image portions not part of said financial amount;

investigating said image representation to locate said extraneous image portions; and removing said extraneous image portions based on their location with respect to said financial amount, said removing including projecting said characters along said row to define a region encompassing said characters and having upper and lower boundaries, and then deleting said extraneous image portions if they are spaced a predetermined amount above and below said boundaries.

25. The method of claim 24, wherein said extraneous image portions include one or more extraneous side image portions located adjacent a side of said row, and wherein said removing includes deleting an extraneous side image portion based on the condition that the spacing between the nearest portion of said financial amount and said extraneous side image portion is a predetermined amount greater than the width of said side image portion.

26. The method of claim 25, wherein said deleting is iteratively repeated so long as said condition continues to be met.

* * * * *